United States Patent
Seki et al.

(10) Patent No.: US 7,136,560 B2
(45) Date of Patent: Nov. 14, 2006

(54) METHOD OF CONTROLLING OPTICAL CHARACTERISTIC OF OPTICAL ELEMENT AND OPTICAL DEVICE

(75) Inventors: Junichi Seki, Yokohama (JP); Takeaki Itsuji, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/524,831

(22) PCT Filed: Sep. 29, 2003

(86) PCT No.: PCT/JP03/12424

§ 371 (c)(1),
(2), (4) Date: Feb. 18, 2005

(87) PCT Pub. No.: WO2004/031821

PCT Pub. Date: Apr. 15, 2004

(65) Prior Publication Data

US 2006/0140568 A1    Jun. 29, 2006

(30) Foreign Application Priority Data

Oct. 1, 2002    (JP)    ............................. 2002-288645

(51) Int. Cl.
*G02B 6/10* (2006.01)
*G02B 6/42* (2006.01)
(52) U.S. Cl. .......................................... 385/129; 385/31
(58) Field of Classification Search .................... None
See application file for complete search history.

(56) References Cited

U.S. PATENT DOCUMENTS 6,188,819 B1    2/2001 Kosaka et al.

6,961,501 B1    11/2005 Matsuura et al. ............ 385/129
2002/0135863 A1*    9/2002 Fukshima et al. .......... 359/298

FOREIGN PATENT DOCUMENTS

| EP | 1 329 758 | 7/2003 |
|----|-----------|--------|
| JP | 10-235829 | 9/1998 |
| JP | 2001-91911 | 4/2001 |
| WO | WO 02/10843 | 2/2002 |
| WO | WO 02/27384 | 4/2002 |

OTHER PUBLICATIONS

E. Yablonovich, "Inhibited Spontaneous Emission in Solid-State Physics and Electronics", The American Physical Society, Physical Review Letters vol. 58, No. 20, pp. 2059-2062 (May 1987).

* cited by examiner

*Primary Examiner*—Sung Pak
(74) *Attorney, Agent, or Firm*—Fitzpatrick, Cella, Harper & Scinto

(57) ABSTRACT

An optical element is formed by using a plurality of pillar-shaped members arranged periodically and a pair of support members arranged perpendicularly relative to the direction of arrangement of the pillar-shaped members so as to sandwich the pillar-shaped members. The optical element showing a periodic structure of periodic distribution of refractive index. An optical characteristic of the optical element is modulated by applying force to the optical element in a direction perpendicular to the direction of arrangement of the pillar-shaped members and changing the diameter of the pillar-shaped members.

8 Claims, 3 Drawing Sheets

METHOD OF CONTROLLING OPTICAL CHARACTERISTIC OF OPTICAL ELEMENT AND OPTICAL DEVICE

TECHNICAL FIELD

The present invention relates to a method of controlling an optical characteristic of an optical element and also to an optical device.

BACKGROUND ART

"Photonic crystal" is an artificial novel crystal that has been proposed in recent years and has been attracting attention ever since (E. Yablonovitch, Phys. Rev. Lett., 58 (1987) 2059–2062). It can be obtained by periodically arranging substances having different refractive indexes at intervals substantially equal to the optical wavelength. Research and development efforts are being paid to produce optical elements out of such a crystal substance because it has peculiar optical characteristics including those of showing a photonic band gap and having apparently abnormal refractive indexes that are attributable to its so-called photonic band structure resembling the band structure of a semiconductor. It can also be engineered artificially in terms of structure and scale.

Active-type optical elements are among such optical elements that are worthy of paying attention. An active-type optical element is an element at least one of whose optical characteristics can be externally and actively controlled not only in the design stage but also while it is being used. Expected applications of active-type optical elements include variable filters, optical switches and many other optical devices.

Japanese Patent Application Laid-Open No. H10-253829 proposes a method of arranging an actuator at the periphery of a fiber diffraction grating and expanding/contracting it to apply tensile force to the fiber so as to control the distribution of refractive indexes in the fiber.

Japanese Patent Application Laid-Open No. 2001-091911 proposes a method of introducing a substance such as a piezoelectric element, with which the refractive index and the transmittivity can be controlled externally, into photonic crystal and disturbing the periodicity of crystal by utilizing expansion/contraction or changes in the characteristics of the substance.

WO02/27384 proposes a method of controlling the lattice spacing of photonic crystal by applying pressure externally to it.

However, these known techniques are accompanied by drawbacks as listed below.

Firstly, the method of expanding/contracting an optical fiber requires a member for transmitting force to the fiber in addition to a member for generating expanding/contracting force that may be a piezoelectric element because the one-dimensional periodic structure arranged in the direction of incident light needs to be changed. Then, there arises a problem that the precision of controlling the lattice spacing depends on the material, the arrangement and the connection of the force transmitting member. Additionally, while apparently abnormal refractive indexes as described above appear in a periodic structure that is two or higher dimensions, the overall arrangement becomes complex when force needs to be applied in two or more than two directions by way of a force transmitting member.

The method of introducing a means for disturbing structure of photonic crystal into the latter requires a large number of processing steps and the scope of materials that can feasibly be used is limited.

Finally, the method of externally applying pressure to a photonic crystal to change the crystal structure thereof is accompanied by a problem that, as pressure is applied to a photonic crystal showing a periodic distribution of refractive indexes as shown in FIG. 5 (vertical parallel lines indicate the period in FIG. 5) to deform the crystal, quantities of deformation are accumulated from the center toward the periphery to remarkably distort the entire crystal as shown in FIG. 6. Additionally, the characteristics of the crystal can appear unevenly at different sites in the crystal. Furthermore, changes in the distribution of refractive indexes within a period, those in the period and those in the phase coexist to make it difficult to control the crystal structure.

In view of the above identified circumstances, it is therefore the object of the present invention to provide a method of controlling an optical characteristic of an optical element that can improve the dimensional precision of the entire optical element, unify the optical characteristics and enhance the degree of freedom of choosing materials and also an optical device that can be used with the method.

DISCLOSURE OF THE INVENTION

The present invention provides a method of controlling an optical characteristic of an optical element and an optical device that have respective configurations as described below.

In an aspect of the invention, there is provided an optical device comprising an optical element formed by using a plurality of pillar-shaped members arranged periodically and a pair of support members arranged perpendicularly relative to the direction of arrangement of the pillar-shaped members so as to sandwich the pillar-shaped members, the optical element showing a periodic structure of periodic distribution of refractive index, and a means for applying force to the pillar-shaped members by way of the support members in a direction perpendicular to the direction of arrangement of the pillar-shaped members.

In another aspect of the invention, there is provided a method of modulating an optical characteristic of an optical element formed by using a plurality of pillar-shaped members arranged periodically and a pair of support members arranged perpendicularly relative to the direction of arrangement of the pillar-shaped members so as to sandwich the pillar-shaped members, the optical element showing a periodic structure of periodic distribution of refractive indexes, wherein the optical characteristic is modulated by applying force to the optical element in a direction perpendicular to the direction of arrangement of the pillar-shaped members and changing the diameter of the pillar-shaped members.

BEST MODE FOR CARRYING OUT THE INVENTION

Figure 1:
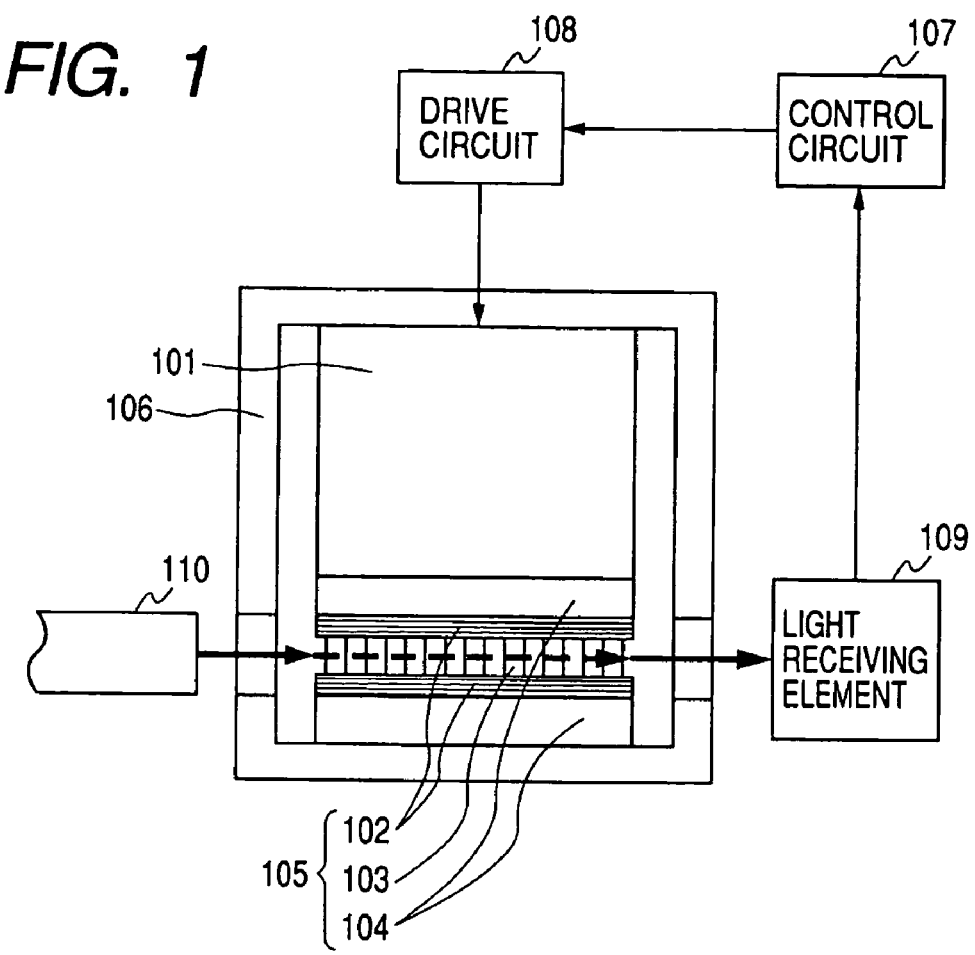
FIG. 1 is a schematic illustration of an embodiment of optical device according to the invention, showing the configuration thereof.

In an embodiment of the invention, a two-dimensional photonic crystal is formed by periodically arranging independent pillar-shaped members that are made of a deformable material and sandwiching the pillar-shaped members between a pair of support members. The support members are rigid and their deformations are negligible. The pillar-shaped members are sandwiched between and rigidly secured to the support members. More specifically, the pillar-shaped members are rigidly secured to the support members by means of an adhesive at the opposite ends thereof. Alternatively, the adhesive may be used only at one of the support members or the support members may support the pillar-shaped members only by pressure without using any adhesive. However, when the support members support the pillar-shaped members only by pressure, only pressure can be transmitted to the pillar-shaped members as external force by way of the support members and no tensile force can be transmitted to them.

An actuator for applying external mechanical force to the surfaces of the support members is fixed to the crystal. The actuator is driven to apply force to the pillar-shaped members perpendicularly by way of the support members. As a result, the height of the pillar-shaped members changes and, at the same time, the diameter and the cross-section of the pillar-shaped members also change at a middle part between the top and the bottom thereof. More specifically, the cross-section of the pillar-shaped members increases at a middle part thereof when pressure is applied to them from the top and bottom support members, whereas it decreases when tensile force is applied to them. The ratio of the change in the cross-section caused by the applied force varies depending on the height and the cross-sectional profile of the pillar-shaped members as well as on Young's modulus and Poisson's ratio that are specific to the material of the pillar-shaped members.

The support members are made of a material having a rigidity sufficiently greater than the pillar-shaped members. Therefore, the force is used effectively to deform the pillar-shaped members. Further, the pillar-shaped members are secured to the support members so that the period of arrangement may not be changed.

The change in the cross-section changes the distribution of refractive indexes in a period that are arranged periodically, to by turn change the photonic band structure. As a result, it is possible to regulate an optical characteristic of the photonic crystal that may relates to reflection or refraction of light.

With the above-described arrangement, the optical characteristic can be regulated substantially only by changing the diameter of the pillar-shaped members. This means that, even when the pillar-shaped members are arranged over a large area, they can be deformed uniformly, while maintaining the overall dimensional precision. In other words, the characteristics of the entire crystal can be unified after a regulating operation.

Additionally, with the above-described arrangement, the members are practically not subjected to restrictions and the designer of such a photonic crystal can enjoy an enhanced degree of freedom for selecting the materials. In other words, the designer can select appropriate materials that can simplify the manufacturing process.

When the support members are made of a piezoelectric material, they can be used as actuators so that force can be directly applied to the pillar shaped members.

The pillar-shaped members are arranged apart from each other. The void space between the pillar-shaped members may be filled with some other materials not preventing the deformation of the pillar-shaped members, including gases, liquids, gel-like materials or flexible resins.

Thus, according to the invention, it is possible to provide a method of controlling an optical characteristic of an optical element that can improve the dimensional precision of the entire optical element, unify the optical characteristics and enhance the degree of freedom of choosing materials. In addition, the invention provides an optical device that can be used with the method.

Now, the present invention will be described by referring to the accompanying drawings that illustrate a preferred embodiment of the invention.

FIG. 1 is a schematic illustration of an embodiment of optical device according to the invention, showing the configuration thereof. Referring to FIG. 1, an actuator 101 formed by using a piezoelectric element and a photonic crystal 105 are laid one on the other and contained in a cabinet 106. The actuator 101 operates to expand and compress the photonic crystal 105 in the opposite directions of the normal to the surfaces of the substrates 104. The cabinet 106 is provided with two holes arranged at a pair of opposite sides of the photonic crystal 105 in order to secure a light path through the photonic crystal 105.

A laser beam that comes from an optical fiber 110 and enters the element through one of the holes is transmitted through the photonic crystal 105 and goes out through the other hole before it strikes light receiving element 109. The light receiving element 109 comprises a photodiode and is adapted to transmit a signal representing the intensity of incident light to a control circuit 107. The control circuit 107 computationally determines a control quantity in such a way that the laser beam enters the light receiving element 109 with a specified intensity and feeds it to drive circuit 108, which drives actuator 101.

Figure 4:
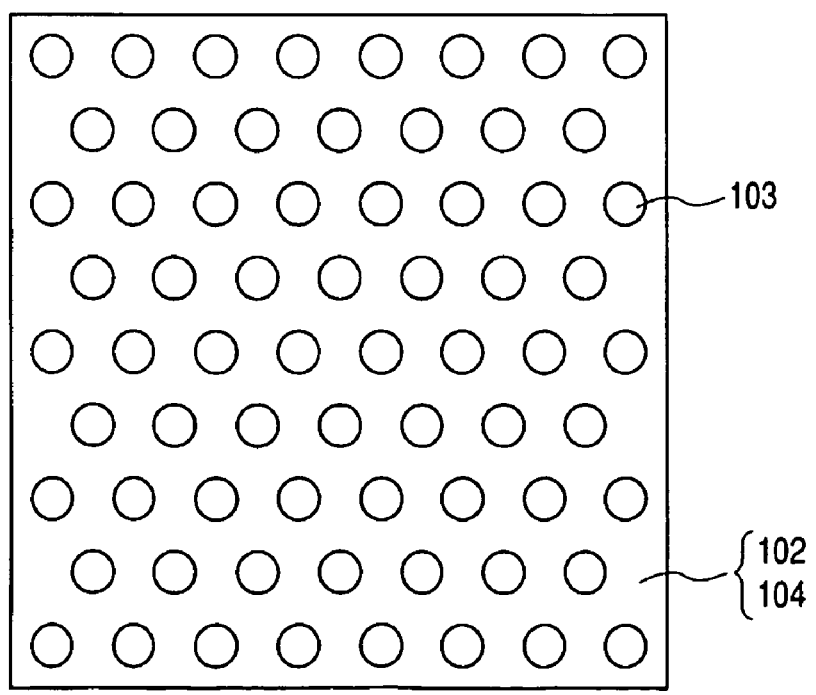
FIG. 4 is a schematic view of the embodiment as seen along the normal to the surface of the substrate to illustrate the periodic structure thereof.
Figure 5:
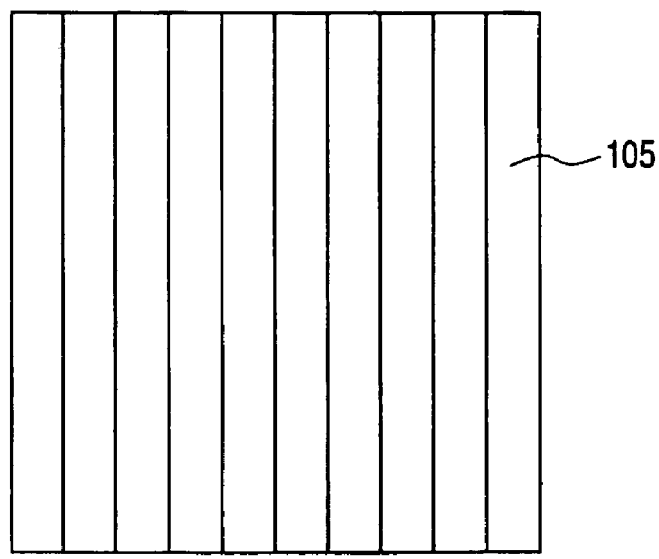
FIG. 5 is a schematic illustration of one of the problems of the prior art.
Figure 6:
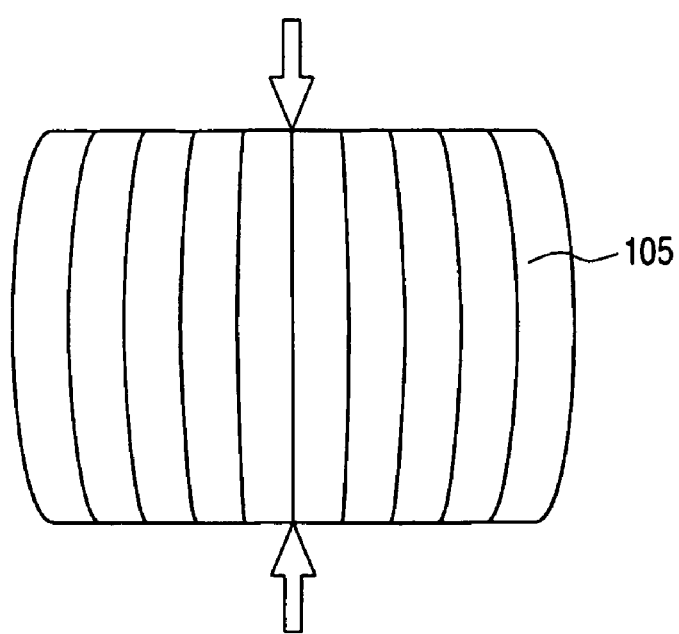
FIG. 6 is a schematic illustration of other one of the problems of the prior art.

The photonic crystal 105 may typically be prepared in a manner as described below. Firstly, a multilayer film is formed by deposition on a substrates 104 that is made of Si to produce a reflection film 102 for the purpose of improve the transmittivity. Then, PMMA (polymethylmethacrylate) is applied onto the reflection film 102 and a periodic structure 103 is formed by X-ray lithography. FIG. 4 is a schematic view as seen along the normal to the surface of the substrate 104 to illustrate the periodic structure thereof. Each of the pillar-shaped members of the periodic structure 103 is isolated and a two-dimensional periodic structure is formed on the surface plane of the reflection film 102 that is parallel to the surface of the substrate 104.

Then, another substrate 104, which is made of Si and on which a reflection film 102 is formed, is prepared and the two substrates 104 are put together with the reflection films 102 facing the periodic structure 103 of PMMA. In this way, a photonic crystal 105 in which a periodic structure 103 is sandwiched between a pair of reflection films 102 that are arranged in parallel with each other and then between a pair of substrates 104 is formed.

Figure 2:
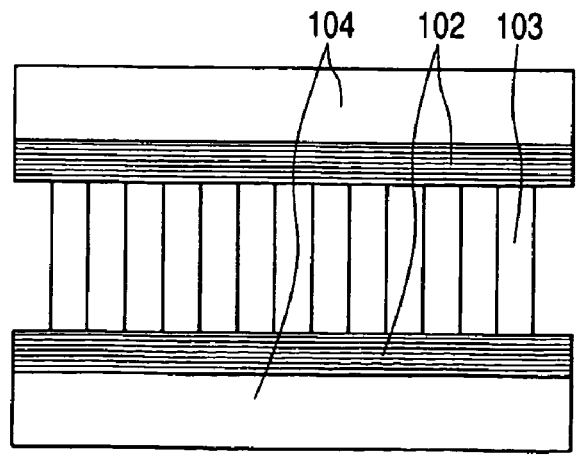
FIG. 2 is a schematic illustration of the optical element of the embodiment of FIG. 1.
Figure 3:
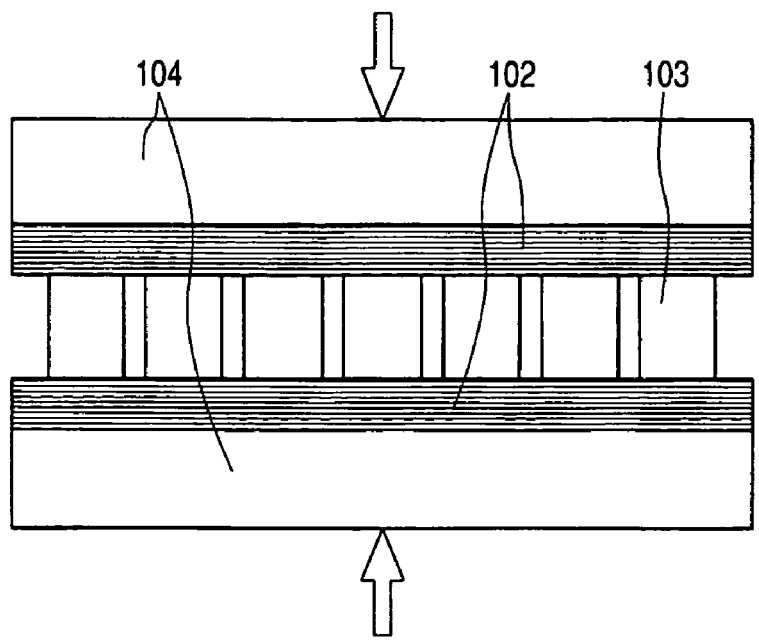
FIG. 3 is a schematic illustration of the operation of regulating the embodiment of FIG. 1.

FIG. 3 illustrates a process of applying external force to the photonic crystal 105 of FIG. 2 along the normal to the substrates 104. Each of the pillar-shaped members of the periodic structure 103 is deformed to change its diameter and the optical characteristics of the photonic crystal 105. Since the individual pillar-shaped members are isolated, no accumulation of quantities of deformation takes place in the plane of arrangement of the periodic structure 103 so that the crystal is not deformed as a whole. Note that the materials of the reflection films 102, the periodic structure 103, the substrates 104 and so on are not limited to those described above. In other words, appropriate materials may be selected from the viewpoint of physical properties including refractive index and Young's modulus, adaptability to the manufacturing process and operating environment including temperature and humidity.

While an piezoelectric element is used as actuator 101 in this embodiment, some other drive mechanism such as a feed screw mechanism or a voice coil may alternatively be used.

Additionally, while the present invention is applied to regulate the transmittivity as optical characteristic, it may be needless to say that it is also applicable to other optical characteristics such as reflectivity.

The invention claimed is:

1. An optical device comprising:
   an optical element formed by using a plurality of pillar-shaped members arranged periodically and a pair of support members arranged perpendicularly relative to the direction of arrangement of said pillar-shaped members so as to sandwich the pillar-shaped members, said optical element showing a periodic structure of periodic distribution of refractive index; and
   means for applying force to said pillar-shaped members by way of the support members in directions perpendicular to the direction of arrangement of said pillar-shaped members so as to both expand and compress the pillar-shaped members.

2. The optical device according to claim 1, wherein the force applied to said pillar-shaped members in directions perpendicular to the direction of arrangement changes not only the height but also the diameter of said pillar-shaped members.

3. The optical device according to claim 1, wherein said support members are made of a material having a rigidity greater than said pillar-shaped members.

4. The optical device according to claim 1, wherein the periodic structure does not change its period when said pillar-shaped members are deformed.

5. The optical device according to claim 1, wherein at least one of said pair of support members is a piezoelectric element.

6. The optical device according to claim 1, wherein a reflection layer is formed on each of said support members at the side facing said pillar-shaped members.

7. The optical device according to claim 1, wherein at least one of said pair of support members is fixed to a piezoelectric element and said means for applying mechanical force comprises electrodes arranged on the piezoelectric element and a circuit for applying a voltage to the electrodes.

8. A method of modulating an optical characteristic of an optical element formed by using a plurality of pillar-shaped members arranged periodically and a pair of support members arranged perpendicularly relative to the direction of arrangement of said pillar-shaped members so as to sandwich the pillar-shaped members, said optical element showing a periodic structure of periodic distribution of refractive indexes, wherein the optical characteristic is modulated by applying force to the optical element in directions perpendicular to the direction of arrangement of the pillar-shaped members so as to both expand and compress the pillar-shaped members and change the diameter of the pillar-shaped members.

* * * * *

UNITED STATES PATENT AND TRADEMARK OFFICE
CERTIFICATE OF CORRECTION

PATENT NO. : 7,136,560 B2
APPLICATION NO. : 10/524831
DATED : November 14, 2006
INVENTOR(S) : Junichi Seki et al.

Page 1 of 1

It is certified that error appears in the above-identified patent and that said Letters Patent is hereby corrected as shown below:

COLUMN 3:
Line 54, "relates" should read --relate--.

COLUMN 5:
Line 13, "an piezoelectric" should read --a piezoelectric--.

Signed and Sealed this

Twenty-fifth Day of December, 2007

JON W. DUDAS
*Director of the United States Patent and Trademark Office*